United States Patent
Miyoshi et al.

(10) Patent No.: US 6,492,448 B1
(45) Date of Patent: Dec. 10, 2002

(54) POLYARYLENESULFIDE RESIN COMPOSITION

(75) Inventors: Masaru Miyoshi, Ichihara (JP); Osamu Komiyama, Ichihara (JP)

(73) Assignee: Dainippon Ink and Chemicals, Incorporated, Tokyo (JP)

( * ) Notice: Subject to any disclaimer, the term of this patent is extended or adjusted under 35 U.S.C. 154(b) by 0 days.

(21) Appl. No.: 09/613,146

(22) Filed: Jul. 11, 2000

(30) Foreign Application Priority Data

Dec. 28, 1999 (JP) ............................................ 11-375172

(51) Int. Cl.⁷ ................................................ C08K 3/22
(52) U.S. Cl. ........................ 524/400; 524/394; 524/399; 524/433; 524/436; 528/381; 528/388
(58) Field of Search ................................. 524/394, 399, 524/400, 432, 433, 436; 528/381, 388

(56) References Cited

U.S. PATENT DOCUMENTS

| | | | |
|---|---|---|---|
| 4,426,479 A | | 1/1984 | Deguchi et al. ............ 524/430 |
| 4,729,854 A | | 3/1988 | Miyata et al. |
| 4,746,698 A | * | 5/1988 | Kouyama et al. |
| 4,898,904 A | | 2/1990 | Yu et al. |
| 5,169,892 A | * | 12/1992 | Kawashima et al. |
| 5,177,137 A | | 1/1993 | Kawashima et al. ........ 524/413 |
| 5,234,770 A | | 8/1993 | Nitoh et al. ................. 428/419 |
| 5,258,442 A | * | 11/1993 | Kato et al. |
| 5,599,864 A | * | 2/1997 | Ogawa et al. |
| 5,824,767 A | * | 10/1998 | Gupta et al. |
| 6,347,890 B2 | * | 2/2002 | Ueno et al. ................. 264/1.25 |

FOREIGN PATENT DOCUMENTS

| | | |
|---|---|---|
| EP | 0 977 190 A1 | 2/2000 |
| JP | 59-209644 | 11/1984 |
| JP | 62-223822 | 1/1987 |
| JP | 62-167355 | 7/1987 |
| JP | 04-161457 A * | 6/1992 |
| JP | 06-322271 | 11/1994 |
| JP | 11-191234 A * | 7/1999 |

OTHER PUBLICATIONS

Search Report from the EPO dated Mar. 14, 2001 and two Derwent abstracts fo non–English documents.

* cited by examiner

*Primary Examiner*—Robert Dawson
*Assistant Examiner*—Marc S Zimmer
(74) *Attorney, Agent, or Firm*—Pitney, Hardin, Kipp & Szuch LLP

(57) ABSTRACT

A resin composition is provided which composition comprises 100 parts by weight of (A) polyarylene sulfide, and 0.01 to 5.0 parts by weight of (B) a product compound of an element selected from the group consisting of group IIA and group IIB of the periodic table, wherein said product compound has such alkalinity that a mixture of said product compound with a 20-fold weight of ultrapure water of grade A4 specified in the Japanese Industrial Standards (JIS) K0557 has a pH of from 10.0 to 12.0. The composition is particularly suited to be used for an optical instrument part such as an object lens driving unit and the like.

3 Claims, 2 Drawing Sheets

POLYARYLENESULFIDE RESIN COMPOSITION

FIELD OF THE INVENTION

The invention relates to a polyarylene sulfide resin composition and an optical instrument part therefrom.

DESCRIPTION OF THE PRIOR ART

Recently, a thermoplastic resin having a high resistance to heat and chemicals is desired for a material for electric or electronic parts, automobile parts or chemical apparatus parts. Polyarylene sulfide (hereinafter, abbreviated as PAS), e.g., polyphenylene sulfide (hereinafter, abbreviated as PPS), attracts attention in recent years, to meet this requirement. However, PAS has a drawback that it tends to evolve corrosive gas such as HCl, $SO_2$, $H_2S$, at a high temperature, particularly in a molten state in an oxygen atmosphere, so that it causes to rust a mold and insert part adjoining to PAS. Another drawback is that a lot of gum adheres to an injection mold.

To solve the drawback regarding the corrosive gas, many methods have been proposed. For example, Japanese Patent Application (JPA) Laid-Open S59-209644 and JPA Laid-Open S60-1241 disclose a method where an inorganic gas scavenger is added to PAS. JPA Laid-Open S60-115658 discloses a method where a corrosive acidic gas evolving from PAS is neutralized by adding a low molecular weight polyamine compound to PAS.

However, the corrosive acidic gas cannot be removed sufficiently by these methods and, accordingly, the formation of rusts caused by the corrosive gas evolving from PAS cannot be prevented for a long time. Further, short-term quick corrosion as well as long-term corrosion of metal adjoining to PAS cannot be solved.

To solve the problem, JPA Laid-Open H6-322271 discloses a PAS resin composition characterized in that it comprises 100 parts by weight of PAS, 0.5 to 10 parts by weight of at least one inorganic filler selected from the group consisting of hydrotalcite compounds and Mg/Al oxides solid solutions, and 0.05 to 3 parts by weight of di(cyclohexyl)ammonium nitrite. However, the composition is still insufficient to reduce corrosive gas and prevent the generation of gum.

JPA Laid-Open S62-167355 describes a method where sodium aluminate is added to PAS to thereby reduce the corrosive gas. However, the generation of the gum cannot be prevented sufficiently by the method.

It is known to use PAS for optical parts such as an object lens driving unit. In JPA Laid-Open H10-143891, a composition of PPS and 20 to 60% of PTFE is used to improve hysteresis and to enhance dimensional precision of a bearing for an object lens driving unit. JPA Laid-Open S62-223822 describes a monolithic PPS lens-holding plate and a monolithic PPS bearing part for a lens holder of an object lens driving unit. The aforesaid plate and part molded from PPS do not have a satisfactory dimensional precision and discoloration caused by gas yellowing is not prevented sufficiently.

SUMMARY OF THE INVENTION

The purpose of the present invention is to provide a polyarylene sulfide resin composition which evolves a significantly reduced amount of the corrosive gas at a high temperature, particularly in a molten state in an oxygen atmosphere whereby discoloration due to gas yellowing is little, and further, the amount of gum evolved from the composition is also small, and still further the dimensional precision is extremely good, that is a dimensional reproducibility in a repetitive molding is excellent. Thus, the present composition is particularly suited to be used for an optical instrument part such as an object lens driving unit.

The present invention is (1) a resin composition comprising 100 parts by weight of (A)polyarylene sulfide, and 0.01 to 5.0 parts by weight of (B) a product compound of an element selected from the group consisting of group IIA and group IIB of the periodic table, wherein said product compound has such alkalinity that a mixture of said product compound with a 20-fold weight of ultrapure water of grade A4 specified in the Japanese Industrial Standards (JIS) K0557 has a pH of from 10.0 to 12.0.

Preferred embodiments of the present invention are as follows.

(2) The composition described in (1) above, wherein the product compound (B) has a BET specific surface area of 10 $m^2$/g or larger.

(3) The composition described in (1) above, wherein the product compound (B) has a BET specific surface area of 14 $m^2$/g or larger.

(4) The composition described in (1) above, wherein the product compound (B) has a BET specific surface area of 20 $m^2$/g or larger.

(5) The composition described in any one of from (1) to (4) above, wherein the product compound (B) is contained in an amount of from 0.05 to 4.0 parts by weight.

(6) The composition described in anyone of from (1) to (5) above, wherein the product compound (B) has the pH of from 10.5 to 11.5.

(7) The composition described in any one of from (1) to (6) above, wherein the product compound (B) is a magnesium compound or a zinc compound.

(8) The composition described in (7) above, wherein the magnesium compound is at least one selected from the group consisting of magnesium oxide, magnesium hydroxide and magnesium silicate.

(9) The composition described in (7) above wherein the zinc compound is at least one selected from the group consisting of basic zinc acetate, zinc phosphate, zinc acetate, and basic zinc chloride.

(10) The composition described in any one of from (1) to (9) above, wherein (C) an inorganic filler is further comprised in an amount of from 0 to 250 parts by weight.

(11) The composition described in any one of from (1) to (9) above, wherein (C)an inorganic filler is further comprised in an amount of from 0 to 200 parts by weight.

(12) A part of an optical instrument, made of the resin composition described in any one of from (1) to (11) above.

(13) A part of an object lens driving unit, made of the resin composition described in any one of from (1) to (11) above.

(14) The part of an object lens driving unit described in (13) above, wherein the part is a lens holder, a holding vessel, or a housing body.

DESCRIPTION OF THE PREFERRED EMBODIMENTS

Figure 1:
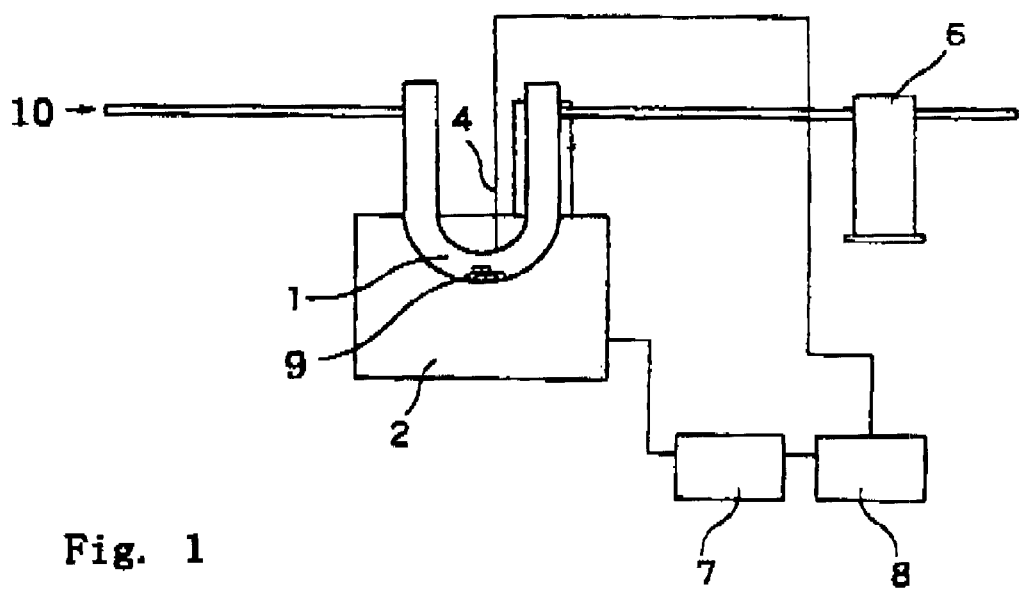
FIG. 1 is a schematic diagram of an instrument for measuring amounts of an evolved gas and gum.

The product compound (B) used in the present invention is a product compound of an element selected from the group consisting of the group IIA and the group IIB of the periodic table. As the product compound, magnesium compounds, zinc compounds, barium compounds and beryllium compounds are preferred. Particularly, magnesium compounds or zinc compounds are preferably used. Preferred magnesium compounds include magnesium oxide (MgO), magnesium hydroxide [Mg(OH)$_2$], magnesium silicate (2 MgO.6SiO$_2$.xH$_2$O), basic magnesium sulfate (MgSO$_4$.5MgO.8H$_2$O), and hydrotalcite-like compounds of the formula, $[(M_1^{2+})_{y1}.(M_2^{2+})_{y2}]_{1-x}$—$M_x^{3+}(OH)_2 \cdot A_{x/n}^{n-} \cdot mH_2O$, wherein $M_1$ represents Mg, $M_2$ represents a divalent metal selected from Zn, Ca and Ba, $M^{3+}$ represents a trivalent metal, and $A^{n-}$ represents an n-valent anion such as $CO_3^{2-}$, $OH^-$, or $HPO^{2-}$. Particularly, at least one compound selected from the group consisting of magnesium oxide, magnesium hydroxide, and magnesium silicate is preferably used. Preferred zinc compounds include zinc acetate, Zn(CH$_3$CO$_2$)$_2$, basic zinc acetate, Zn(CH$_3$CO$_2$)$_2$.ZnO, Zn$_4$O(CH$_2$CO$_2$)$_6$, zinc phosphate, Zn$_3$(PO$_4$)$_2$, and basic zinc chloride, Zn(OH)Cl. Particularly, at least one compound selected from the group consisting of basic zinc acetate, zinc phosphate and basic zinc chloride is preferably used. Examples of the preferred barium compounds include basic barium acetate and basic barium chloride. An example of the preferred beryllium compound is basic beryllium acetate.

The product compound (B) used in the present invention has a pH of at most 12.0, preferably at most 11.5 and at least 10.0, preferably at least 10.5, when mixed with a 20-fold weight of ultrapure water of grade A4 specified in the Japanese Industrial Standards (JIS) K0557. If the pH exceeds the aforesaid higher limit, more corrosive gas evolves to cause gas yellowing, more gum is generated, and dimensional precision of molded articles is also worse. If the pH is lower than the aforesaid lower limit, amounts of the corrosive gas and gum are both undesirably large. For product compounds hardly soluble or insoluble in water, their pH is measured after adding several drops of acetone, methanol or ethanol to the aforesaid water, provided that the pH of the water is scarcely changed.

In addition, the product compound (B) preferably has a BET specific surface area of at least 10 m$^2$/g, more preferably at least 14 m$^2$/g, still more preferably at least 20 m$^2$/g, in particular, 50 m$^2$/g. In the present invention, a larger BET specific surface area is advantageous. If the BET specific surface area is smaller than the aforesaid lower limit, amounts of the corrosive gas and gum are both undesirably large.

The product compound (B) is incorporated in an amount, per 100 parts by weight of PAS (A), of at most 5.0 parts by weight, preferably at most 4.0 parts by weight, particularly at most 3.0 parts by weight and at least 0.01 part by weight, preferably at least 0.05 part by weight, particularly at least 0.1 part by weight. If it is incorporated more than the aforesaid higher limit, more corrosive gas evolves to cause gas yellowing, more gum is generated, and dimensional precision of molded articles is also worse, and further, moldability is worse. If incorporated less than the aforesaid lower limit, amounts of the corrosive gas and gum are both undesirably large.

In the present invention, any known PAS can be used such as a substantially linear PAS, branched PAS and thermal-oxidation crosslinked PAS. Any method of producing these PAS may be employed. Usually, PAS is prepared by reacting an alkaline metal sulfide with an aromatic dihalide compound in an organic amide solvent. For example, PAS can be prepared by a method described in Japanese Patent Publication S45-3368, a method described in Japanese Patent Publication S52-1224, where alkaline metal carboxylate is used; a method described in U.S. Pat. No. 4,038,263 where a polymerization accelerator such as lithium halide is used; a method described in Japanese Patent Publication S54-8719, where a crosslinking agent such as polyhologenoaromatic compound is used; a method described in Japanese Patent Publication S63-33775, where a multi-process reaction under the presence of water in an amount specific to each process is employed; or a method described in Japanese Patent Application Laid-Open H5-222196, where an alkaline metal sulfide is reacted with an aromatic dihalide compound in an organic amide solvent while a part of the gas phase in a reaction vessel is condensed by cooling the gas phase in the reaction vessel and the condensed liquid is recycled into the liquid phase. The PAS obtained by the above-described method can be crosslinked by thermal oxidation.

The organic amide solvent used for preparing PAS is known for this purpose. For example, N-methylpyrrolidone (NMP), N,N-dimethylformamide, N,N-dimethylacetamide, N-methylcaprolactam or a mixture thereof can be used, among which NMP is preferred.

The alkaline metal sulfide is also known and may be, for example, lithium sulfide, sodium sulfide, potassium sulfide, rubidium sulfide, cesium sulfide or a mixture thereof. It may be in a form of hydrate or an aqueous solution. Products prepared by neutralizing alkaline metal hydrosulfide or its hydrate with the corresponding hydroxide can be used. Sodium sulfide is preferred because it is inexpensive.

The aromatic dihalide compound can be selected, for example, from the compounds described in Japanese Patent Publication S45-3368, and is preferably p-dichlorobenzene. Copolymers can be obtained by using a small amount, not more than 20%, of at least one selected from the group consisting of para-, meta- or ortho-dihalogenated diphenylether, diphenylsulfone, and biphenyl. Examples include m-dichlorobenzene, o-dichlorobenzene, p,p'-dichlorodiphenylether, m,p'-dichlorodiphenylether, m,m'-dichlorodiphenylether, p,p'-dichlorodiphenylsulfone, m,p'-dichlorodiphenylsulfone, m.m'-dichlorodiphenylsulfone, p,p'-dichlorobiphenyl, m,p'-dichlorobiphenyl, and m,m'-dichlorobiphenyl.

To increase a molecular weight of PAS, a polyhalide compound such as 1,3,5-trichlorobenzene, and 1,2,4-trichlorobenzene can be used in an amount of at most 5 mole % of a total of para- and meta-dihalogenated aromatic compounds.

Other additives may also be used in a small amount, such as monohalide compounds as an end group terminating agents, or a modifier.

The obtained PAS can be isolated from by-products by a make-up known to those skilled in the art.

In the present PAS resin composition, (c) an inorganic filler may be incorporated as an optional component. Any inorganic filler may be used, for example, powdery/flaky fillers, and fibrous fillers. Examples of the powdery/flaky fillers include alumina, talc, mica, kaolin, clay, titanium oxide, calcium carbonate, calcium silicate, calcium phosphate, calcium sulfate, magnesium oxide, magnesiumphosphate, silicon nitride, glass, hydrotalcite, zirconiumoxide, glass beads, and carbon black. Examples of the fibrous fillers include glass fiber, asbestos fiber, carbon fiber, silica fiber, silica/alumina fiber, potassium titanate fiber, and polyaramid fiber. Other fillers may also be used such as tetrapod-type ZnO, metal salts, such as zinc chloride and lead sulfate; oxides such as ferric oxide, and molybdenum dioxide; and metals such as aluminum and stainless steel. These fillers may be used alone or as a mixture of two or more of them. Further, the organic filler may be surface treated with a silane coupling agent or a titanate coupling agent.

The component (C), inorganic filler, may be mixed in an amount, per 100 parts by weight of PAS (A), of at most 250 parts by weight, preferably at most 200 parts by weight. If the component (C) exceeds the aforesaid higher limit, undesirably large amounts of corrosive gas and gum may evolve. To increase mechanical strength, the component (c) is preferably mixed in an amount of at least 0.01 part by weight, more preferably of at least 100 parts by weight.

Further, if necessary, known additives and fillers can be mixed in addition to the above components, such as antioxidants, UV-absorbents, mold release agents, thermal stabilizers, lubricants, and colorants.

The present resin composition can be prepared in any manner. For example, the components are mechanically mixed, melt-kneaded in a conventional instrument such as an extruder, and pelletized. A master batch may be added to a neat resin, melt-kneaded and pelletized. Alternatively, the components may be fed one by one in an extruder and then melt-kneaded. The present resin composition can be used widely for, for example, automobile parts, electric or electronic parts, optical instruments parts, chemical instruments parts, food containers, or building materials. A molded article made of the present resin composition has a superior dimensional precision, and shows a significantly less evolving gas, and accordingly, little discoloration by gas yellowing, and, thus, is suited particularly for optical instruments parts. Examples of the optical instruments parts are parts of an object lens driving unit such as a lens-holder, a holding vessel, a supporting shaft inserted in a lens-holder, which shaft allows the lens-holder to rotate or to move back and forth, a bearing to support the shaft and a housing to protect these parts from impact, as described in Japanese Patent Application Laid-Open H10-143891 and Japanese Patent Application Laid-open S62-223822; a part of an light pick-up instrument, such as a container to enclose components such as a light source, an object lens, and a light receiving section, in which instrument an optical recording medium such as a compact disk is irradiated with a light beam, the reflected light from the recording surface is received to obtain optical signals according to changes in the light beam reflected at the recording surface and the signals are transformed into electric signals to be recorded or played-back, as described in Japanese Patent Application Laid-open H10-293940; and apart of an a collimator-lens holder used in copying machines, printers, or facsimile machines where a laser light emitted from a laser generator passes in a collimator-lens and scans an object by the aid of a scanning means.

EXAMPLES

The present invention will be explained in detail below with reference to the following Examples, but not limited by them.

Examples 1 to 8 and Comparative Examples 1 to 6

The following substances were used in the Examples and the Comparative Examples.

(A) PPS: T-4(trademark), semilinear type, ex Tohpren Co. Ltd.

(B) Product compound.
Magnesium Compounds
Magnesium oxide (MgO) (I): pH=11.9, BET specific surface area=148 $m^2/g$.
Magnesium hydroxide [$Mg(OH)_2$] (I): pH=10.3. BET specific surface area=22 $m^2/g$.
Magnesium silicate (2 $MgO.6SiO_2.xH_2O$) (I): pH=11.5, BET specific surface area=14 $m^2/g$.
Zinc Compounds
Basic zinc acetate[$Zn(CH_3CO_2)_2.ZnO$]: pH=10.2, BET specific surface area=21 $m^2/g$.
Zinc phosphate[$Zn_3(PO_4)_2$]: pH=10.2, BET specific surface area=14 $m^2/g$.

(C)Inorganic Fillers.
Glass fiber: CS 3J-961S(trade mark), having a diameter of 13 μm, surface treated with aminosilane, ex Nitto Boseki Co.
Potassium titanate: TISMO D (trade mark), ex Ohtsuka Kagaku Co.
Calcium carbonate: Whiton-SB(trade mark), ex Shiraishi Calcium Co.
Substances for Comparison
Magnesium chloride ($MgCl_2$): pH=7.5, BET specific surface area=23 $m^2/g$.
Zinc chloride ($ZnCl_2$): pH=6.0, BET specific surface area=10 $m^2/g$.
Barium chloride ($BaCl_2$): pH=5.6, BET specific surface area=12 $m^2/g$.
Measurement of a pH on the Product Compound (B) and the Substances for Comparison One gram of the product compound (B) or the substance for comparison was accurately weighed and placed in a 50 ml beaker, to which 20 g of ultrapure water of grade A4 specified in Japanese Industrial Standards (JIS) K0557 was added. The obtained mixture was stirred with a stirrer and allowed to stand for 5 minutes. After stirring for additional 10 minutes, a pH was measured with an automatic pH meter.

To measure a pH of compounds hardly soluble or insoluble in water, a few drops of acetone were added to the ultrapure water in such an amount that the pH of the water was not changed, and stirred. For compounds which did not dissolve sufficiently even with the addition of acetone, methanol and ethanol were tried instead of acetone to dissolve the compound well. The ultrapure water of grade A4 specified in JIS K0557 was prepared with Barnstead NANOpure D4746 (trade mark), Nanopure Dionaization System, ex Millipore Ltd.
Measurement of the Amount of an Evolved Gas In the Examples and the Comparative examples, the components of the amounts as shown in Table 1 and 2 were pre-mixed homogeneously by a Henshell mixer for 5 minutes and melt-kneaded into pellets in a counterrotating twin-screw extruder having a diameter of 20 mm at 130° C. at a rotational speed of 400 rpm.

The amount of an evolved gas was determined as follows.
FIG. 1 is a schematic diagram of the instrument used. About 1 g of a sample 9 was accurately weighed and placed in the bottom of the U tube 1 having a diameter of 18 mm, which tube was then set as shown in the FIG. 1. Then, air 10 was introduced in a flow rate of 20 ml/min. After a stable flow rate was attained, the heater 2 was turned on. The heater 2 was controlled by temperature controller 8 and potential transformer 7 with temperature of the heater being measured with thermocouple 4. Evolved gas was trapped in gas washing bottle 6 containing a mixed solution of 35 g of a 0.1 mole/liter aqueous solution of NaOH, 35 g of an aqueous 31% solution of $H_2O_2$ and 150 g of deionized water. Three hours after the temperature of the heater reached 330° C., the washing bottle was immersed in water at 70° C. to deaerate the mixed solution. A portion of the mixed solution was taken out and quantitatively analyzed for $Cl^-$ and $SO_4^{2-}$ by an ion chromatograph, model 2000 i/sp, equipped with Ionpac AS4A column, ex Nihon Dionex Co.

Observation of Gas Yellowing

According to JIS K7152, ISO 294, Number 1 dumbbell type test pieces for tensile test according to JIS K7113 were injection molded in a single cavity mold with an injection molding machine, model SG-150, ex Sumitomo Heavy Industry Co., at a molten resin temperature of 320° C. and a mold surface temperature of 130° C. The dumbbell type test pieces were inspected for gas yellowing at the farthest part from the gate where a corrosive gas tends to stay most.

In Tables 1 and 2, "O" means that no gas yellowing was observed and "X" means that gas yellowing was observed.

Figure 2:
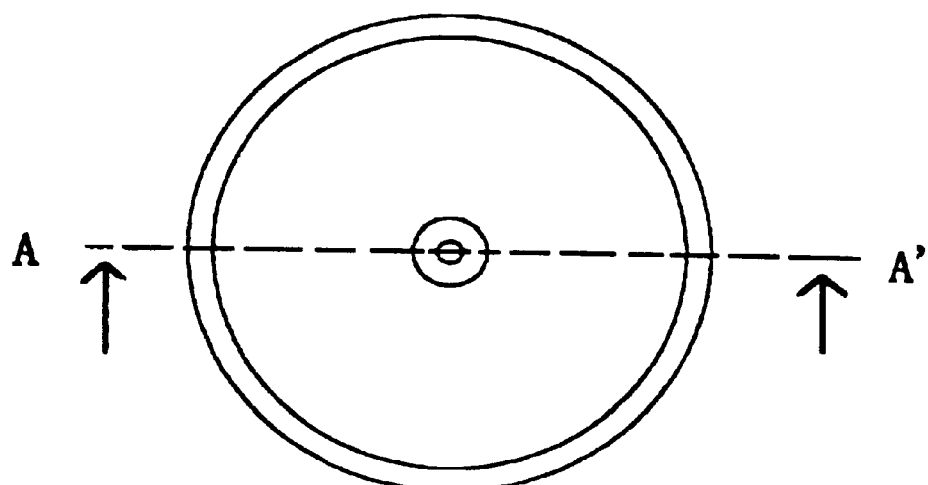
FIG. 2 is a plan view of a lens holder of an object lens driving unit molded in the Example.
Figure 3:
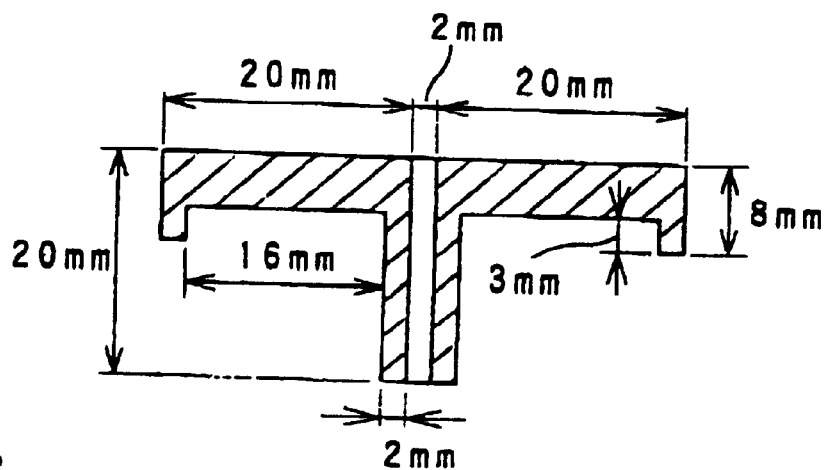
FIG. 3 is a cross-sectional view taken along the line A–A' in FIG. 2.

With the pellets prepared as mentioned in "Measurement of the Amount of an Evolved Gas", thirty articles having a shape like a lens holder of an object lens driving unit as shown in FIG. 2 and FIG. 3 were injection molded at a molding machine temperature of 320° C. and a mold temperature of 90° C. Numerals in FIG. 2 represent dimensions expressed in mm.

From the 30 molded articles, 20 molded articles were chosen at random. A distance from the center to the edge, i.e., radius, was measured on each article. The difference between the maximum radius and the minimum is considered as dimensional precision.

The results are as shown in Tables 1 and 2.

TABLE 1

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Resin composition (parts by weight) | | | | | | | | |
| (A) PPS | 100 | 100 | 100 | 100 | 100 | 100 | 100 | 100 |
| (B) Magnesium oxide (I) | 0.1 | 1 | — | — | — | — | 1 | 1 |
| Magunesium hydroxide (I) | — | — | 1 | — | — | — | — | — |
| Magunesium silicate (I) | — | — | — | 1 | — | — | — | — |
| Basic zinc acetate | — | — | — | — | 1 | — | — | — |
| Zinc phosphate | — | — | — | — | — | 1 | — | — |
| (C) Glass fiber | — | — | — | — | — | — | 66.6 | 66.6 |
| Potassium titanate | — | — | — | — | — | — | 66.6 | 66.6 |
| Calcium carbonate | — | — | — | — | — | — | — | 33.3 |
| Amount of evolved gas (wt. ppm) | | | | | | | | |
| $SO_4^{2-}$ 3 hours after | 102 | 94 | 89 | 83 | 99 | 100 | 78 | 72 |
| $Cl^-$ 3 hours after | 5 | 0 | 0 | 4 | 5 | 5 | 5 | 5 |
| Gas yellowing | O | O | O | O | O | O | O | O |
| Dimensional precision (mm) | 0.10 | 0.09 | 0.09 | 0.09 | 0.10 | 0.10 | 0.10 | 0.08 |

TABLE 2

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Resin composition (parts by weight) | | | | | | |
| (A) PPS | 100 | 100 | 100 | 100 | 100 | 100 |
| (Substances for comparison) | | | | | | |
| Magnesium chloride | — | 1 | — | — | — | — |
| Zinc chloride | — | — | 1 | — | — | — |
| Barium chloride | — | — | — | 1 | — | — |
| (C) Glass fiber | — | — | — | — | 333 | 200 |
| Potassium titanate | — | — | — | — | 66.6 | 66.6 |
| Calcium carbonate | — | — | — | — | — | 133.3 |
|  |  |  |  |  | *1 | *1 |
| Amount of evolved gas (wt. ppm) | | | | | | |
| $SO_4^{2-}$ 3 hours after | 160 | 120 | 120 | 120 | — | — |
| $Cl^-$ 3 hours after | 50 | 20 | 40 | 40 | — | — |
| Gas yellowing | X | X | X | X | — | — |
| Dimensional precision (mm) | 0.14 | 0.1 | 0.09 | 0.09 | — | — |

*1: Samples could not be prepared because the viscosity of the composition was too high to be kneaded with the kneader.

In Examples 1 and 2, the mixed amount of component (B), magnesium oxide(I), was varied within the range specified in the present invention. The amount of the evolved gas was found to decrease with the increasing amount of component (B). In both of the Examples, no gas yellowing was observed and the dimensional precision was good. In Example 3, use was made of magnesium hydroxide having a lower pH than that of magnesium oxide (I) used in Example 2. A similar level of the effects were attained as with magnesium oxide (I). Example 4 was conducted as in Example 2 except that magnesium silicate was used instead of magnesium oxide (I). Although a little amount of evolved chlorine was observed, no gas yellowing was observed and the dimensional precision was good. In Examples 5 and 6, Example 2 was repeated except that basic zinc acetate and zinc phosphate were used, respectively, instead of magnesium oxide (I). In both of the Examples, the amount of evolved gas was small, no gas yellowing was observed and the dimensional precision was good.

Meanwhile, in Comparative Example 1, component (B) was not mixed. A significant amount of evolved gas and gas yellowing was observed and the dimensional precision was worse. In Comparative Examples 2 to 4, Example 2 was repeated except that magnesium chloride, zinc chloride and barium chloride having a pH below the present range were used, respectively, instead of magnesium oxide (I). A significant amount of the evolved gas and gas yellowing was observed.

In Examples 7 and 8, component (C) was mixed in a weight ratio within the range specified in the present invention. Comparing with Comparative Example 1 where component (B) was not mixed, a less amount of evolved gas and no gas yellowing was observed and the dimensional precision was better. In Comparative Examples 5 and 6, where component (c) was mixed in a weight ratio more than the present upper limit, the viscosity of the composition was too high to be kneaded with a kneader.

Examples 9 to 16 and Comparative Examples 7 to 18

The following substances were used in the Examples and the Comparative Examples.

(A) PPS: T-1(trade mark), semilinear type, ex Tohpren Co., Ltd.

(B)
Magnesium Compounds
Magnesium oxide (MgO) (II): pH=11.5, BET specific surface area=40 m²/g.
Magnesium oxide (MgO) (III): pH=11.9, BET specific surface area=148 m²/g.
Magnesium oxide (MgO) (IV): pH=10.8, BET specific surface area=8 m³/g.
Magnesium hydroxide [Mg(OH)$_2$](II): pH=10.3, BET specific surface area=22 m²/g.
Magnesium silicate (2MgO.6SiO$_2$.xH$_2$O) (II): pH=11.5, BET specific surface area=14 m²/g.

(C) Inorganic Fillers
The same glass fiber and calcium carbonate as those described above were used.
Substance for Comparison
Talc(4SiO$_2$·3MgO·H$_2$O): pH=6.9, BET specific surface area=12 m²/g.
Magnesium aluminum oxide (MgO$_{0.7}$Al$_{0.3}$O$_{1.15}$, Mg/Al oxides solid solution): pH=9.7, BET specific surface area= 110 m²/g, KW2000 (trade mark), ex Kyowa Kagaku Kogyo Co, equivalent to the Mg/Al oxides solid solution described in Japanese Patent Application Laid-Open No. H6-322271.
Basic aluminum magnesium carbonate hydrate [Mg$_{4.5}$Al$_2$(OH)$_{13}$CO$_3$.3.5H$_2$O, hydrotalcite compound]: pH=9.4, BET specific surface area=13.1 m²/g, DHT-4A(trade mark), ex Kyowa Xagaku Kogyo Co, equivalent to the hydrotalcite compounds described in Japanese Patent Application Laid-Open No. H6-322271.
Magnesium sulfite (MgSO$_3$): pH=13.0, BET specific surface area=15.0 m²/g.
Sodium hydroxide (NaOH): pH=14.0, BET specific surface area=2.0 m²/g.
Measurement of a pH on the Product Compound (B) and the Substances for Comparison
Measurement was performed as described above.
Measurement of Amounts of Evolved Gas and Gum
In all of the Examples and the Comparative Examples, pellets were prepared in the same manner as described above using the components in the amounts described in Table 3 and 4.
The amount of evolved gas was measured in the same way as described above 3 hours after a time when the temperature of the heater reached 330° C. The amount of gum was measured with an apparatus shown in FIG. 1 by heating exit part of U tube 1 with a ribbon heater 3 at 190° C. and trapping the gum thus evolved in quartz wool 5 placed in a PTFE tube connected to the exit of U tube 1.
The results are as shown in Tables 3 and 4.

TABLE 3

|  | Ex. 9 | Ex. 10 | Ex. 11 | Ex. 12 | Ex. 13 | Ex. 14 | Ex. 15 | Ex. 16 |
| --- | --- | --- | --- | --- | --- | --- | --- | --- |
| Resin composition (parts by weight) |  |  |  |  |  |  |  |  |
| (A) PPS | 100 | 100 | 100 | 100 | 100 | 100 | 100 | 100 |
| (B) Magnesium oxide (II) | 0.1 | 1 | 3 | — | — | — | 1 | 1 |
| Magnesium oxide (III) | — | — | — | 1 | — | — | — | — |
| Magnesium hydroxide (II) | — | — | — | — | 1 | — | — | — |
| Magnesium silicate (II) | — | — | — | — | — | 1 | — | — |
| (C) Glass fiber | — | — | — | — | — | — | 66.6 | 66.6 |
| Calcium carbonate | — | — | — | — | — | — | — | 33.3 |
| Amount of evolved gas (wt. ppm) |  |  |  |  |  |  |  |  |
| SO$_4^{2-}$ 3 hours after | 102 | 94 | 81 | 76 | 89 | 83 | 61 | 51 |
| Cl$^-$ 3 hours after | 5 | 0 | 0 | 0 | 0 | 5 | 5 | 3 |
| Amount of gum (wt. ppm) | 400 | 300 | 300 | 250 | 300 | 400 | 600 | 600 |

TABLE 4

|  | Comp. Ex. 7 | Comp. Ex. 8 | Comp. Ex. 9 | Comp. Ex. 10 | Comp. Ex. 11 | Comp. Ex. 12 |
| --- | --- | --- | --- | --- | --- | --- |
| Resin composition (parts by weight) |  |  |  |  |  |  |
| (A) PPS | 100 | 100 | 100 | 100 | 100 | 100 |
| (Substances for comparison) |  |  |  |  |  |  |
| Magnesium oxide (II) | — | 10 | 20 | — | — | — |
| Magnesium oxide (IV) | — | — | — | 1 | — | — |
| Talc | — | — | — | — | 1 | — |
| Aluminum magnesium oxide | — | — | — | — | — | 1 |
| Basic aluminum magnesium Carbonate hydrate | — | — | — | — | — | — |
| Magnesium sulfite | — | — | — | — | — | — |

TABLE 4-continued

| | | | | | | |
|---|---|---|---|---|---|---|
| Sodium hydroxide | — | — | — | — | — | — |
| (C) Glass fiber | — | — | — | — | — | — |
| Potassium carbonate | — | — | —*1 | — | — | — |
| Amount of evolved gas (wt. ppm) | | | | | | |
| $SO_4^{2-}$ 3 hours after | 160 | 80 | — | 110 | 120 | 107 |
| $Cl^-$ 3 hours after | 50 | 0 | — | 10 | 20 | 10 |
| Amount of gum (wt. ppm) | 800 | 700 | — | 700 | 700 | 700 |

| | Comp. Ex. 13 | Comp. Ex. 14 | Comp. Ex. 15 | Comp. Ex. 16 | Comp. Ex. 17 | Comp. Ex. 18 |
|---|---|---|---|---|---|---|
| Resin composition (parts by weight) | | | | | | |
| (A) PPS | 100 | 100 | 100 | 100 | 100 | 100 |
| (Substances for comparison) | | | | | | |
| Magnesium oxide (II) | — | — | — | — | 1 | 1 |
| Magnesium oxide (IV) | | | | | | |
| Talc | — | — | — | — | — | — |
| Aluminum magnesium oxide | — | — | — | — | — | — |
| Basic aluminum magnesium | 1 | — | — | — | — | — |
| Carbonate hydrate | | | | | | |
| Magnesium sulfite | — | 1 | — | — | — | — |
| Sodium hydroxide | — | — | 1 | — | — | — |
| (C) Glass fiber | — | — | — | 66.6 | 300 | 150 |
| Potassium carbonate | — | — | — | — | — | 150 |
| Amount of evolved gas (wt. ppm) | | | | | | |
| $SO_4^{2-}$ 3 hours after | 118 | 91 | 80 | 162 | 90 | 80 |
| $Cl^-$ 3 hours after | 20 | 20 | 0 | 20 | 20 | 20 |
| Amount of gum (wt. ppm) | 700 | 700 | 700 | 1000 | 2500 | 1800 |

*1: Samples could not be prepared because the viscosity of the composition was too high to be kneaded with the kneader.

In Examples 9 to 11, the mixed amount of component (B), magnesium oxide(II), was varied within the range specified in the present invention. The amounts of the evolved gas and gum were found to decrease with the increasing amount of component (B). Example 12 was conducted as in Example 10 except that magnesium oxide (III) having a larger BET specific surface area was used instead of magnesium oxide (II). The amounts of the evolved gas and gum decreased both. Example 13 was conducted as in Example 10 except that magnesium hydroxide (II) having a lower pH and a smaller BET specific surface area was used instead of magnesium oxide (II). A similar level of the effects were attained as with magnesium oxide (II). Example 14 was conduced as in Example 10 except that magnesium silicate (II) having a smaller BET specific surface area was used instead of magnesium oxide (II). The amounts of the evolved gas and gum were both small.

Meanwhile, in Comparative Example 7, component (B) was not mixed. The amounts of the evolved gas and gum were significantly large. In Comparative Example 8, a larger amount of component (B), magnesium oxide(II), than the upper limit in the present invention was mixed. The amount of the gum was larger. In Comparative Example 9, a much larger amount of component (B), magnesium oxide (II), was mixed. The viscosity of the composition was too high to be kneaded. The Comparative Example 10 was conducted as in Example 10 except that magnesium oxide (IV) having a smaller BET surface area was used instead of magnesium oxide (II). The amounts of the evolved gas and gum were both significantly larger. Comparative Example 11 was conducted as in Example 10 except that use was made of talc having a pH lower than the lowest pH specified in the present invention. The amounts of the evolved gas and gum were both significantly larger. In Comparative Examples 12 and 13, a solid solution of Mg/Al oxides and a hydrotalcite compound as described in Japanese Patent Application Laid-open H6-322271 were used, respectively. In Comparative Examples 12 and 13, the amounts of the evolved gas and gum were both significantly large compared with those in Example 10. In Comparative Example 14, use was made of magnesium sulfite having a pH higher than the highest pH specified in the present invention. The amount of the gum was significantly larger. In Comparative Example 15, use was made of sodium hydroxide having a pH higher than the highest pH specified in the present invention. The amount of the gum was significantly larger.

In Examples 15 and 16, component (c) was mixed in weight ratios within the range specified in the present invention. The amounts of the evolved gas and gum were both significantly small, compared with those in Comparative Example 16 where component (B) was not mixed and Comparative Examples 17 and 18 where the amount of component (C) was more than the largest amount specified in the present invention.

What is claimed is:

1. A part of an object lens driving unit, said part being made of the resin composition comprising 100 parts by weight of (A) polyarylene sulfide, and 0.01 to 5.0 parts by weight of (B) a product compound selected from the group consisting of magnesium oxide, magnesium hydroxide, magnesium silicate, and mixtures thereof, wherein said product compound has such alkalinity that a mixture of said product compound with a 20-fold weight of ultrapure water of grade A4 specific in the Japanese Industrial Standards (JIS) K0557 has a pH of from 10.0 to 12.0, and wherein said product compound (B) has a BET surface area of 10 $m^2/g$ or larger.

2. The part of an object lens driving unit according to claim 1, wherein the resin composition further comprises an inorganic filler in an amount from 0 to 250 parts by weight.

3. The part of an object lens driving unit according to claim 1, wherein the part is a lens holder, a holding vessel, or a housing body.

* * * * *